(12) United States Patent
Takeuchi et al.

(10) Patent No.: US 7,927,741 B2
(45) Date of Patent: Apr. 19, 2011

(54) LITHIUM TRANSITION METAL OXIDE HAVING LAYERED STRUCTURE

(75) Inventors: Tomoya Takeuchi, Takehara (JP); Shinya Kagei, Takehara (JP); Naoki Kumada, Takehara (JP); Keisuke Miyanohara, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 12/524,274

(22) PCT Filed: Jan. 28, 2008

(86) PCT No.: PCT/JP2008/051702
§ 371 (c)(1),
(2), (4) Date: Jul. 23, 2009

(87) PCT Pub. No.: WO2008/091028
PCT Pub. Date: Jul. 31, 2008

(65) Prior Publication Data
US 2010/0117025 A1 May 13, 2010

(30) Foreign Application Priority Data
Jan. 26, 2007 (JP) ................................. 2007-017155

(51) Int. Cl.
*C01G 53/00* (2006.01)
(52) U.S. Cl. ............. 429/231.1; 429/231.3; 429/231.95; 423/179.5; 423/594.4; 423/594.6; 423/599
(58) Field of Classification Search ............... 429/231.1, 429/231.3, 231.95; 423/179.5, 594.4, 594.6, 423/599
See application file for complete search history.

(56) References Cited

U.S. PATENT DOCUMENTS

| | | | |
|---|---|---|---|
| 2003/0082453 A1 * | 5/2003 | Numata et al. | 429/231.95 |
| 2004/0013941 A1 | 1/2004 | Kobayashi et al. | |
| 2004/0170894 A1 | 9/2004 | Sakai et al. | |
| 2005/0079416 A1 | 4/2005 | Ohzuku et al. | |
| 2006/0105239 A1 * | 5/2006 | Paulsen et al. | 429/231.3 |
| 2006/0286457 A1 * | 12/2006 | Sasaki | 429/231.3 |
| 2007/0202405 A1 | 8/2007 | Shizuka et al. | |
| 2007/0253892 A1 | 11/2007 | Sakai et al. | |
| 2009/0117469 A1 * | 5/2009 | Hiratsuka et al. | 429/231.8 |

FOREIGN PATENT DOCUMENTS

| | | |
|---|---|---|
| EP | 1391949 A2 | 2/2004 |
| JP | 8171910 A | 7/1996 |
| JP | 10069910 A | 3/1998 |
| JP | 2000203843 A | 7/2000 |
| JP | 2002226214 A | 8/2002 |
| JP | 2003017052 A | 1/2003 |
| JP | 2003034536 A | 2/2003 |
| JP | 2003086184 A | 3/2003 |
| JP | 2004253169 A | 9/2004 |
| JP | 2004273451 A | 9/2004 |
| JP | 2004355824 A | 12/2004 |
| JP | 2005025975 A | 1/2005 |
| JP | 2005222956 A | 8/2005 |
| JP | 2006114408 A | 4/2006 |
| JP | 2006302542 A | 11/2006 |
| JP | 2006318928 A | 11/2006 |
| JP | 2007119340 A | 5/2007 |
| WO | 03003487 A1 | 1/2003 |
| WO | 03003488 A1 | 1/2003 |
| WO | 2005104274 A1 | 11/2005 |

OTHER PUBLICATIONS

Arjun Kumar, "Development of cathode materials for Li-ion battery and megalo-capacitance capacitor" Sep. 2007, Division of Energy and Materials Science Graduate School of Science and Engineering, Saga University, PhD Dissertation.*

* cited by examiner

*Primary Examiner* — Steven Bos
(74) *Attorney, Agent, or Firm* — The Webb Law Firm

(57) ABSTRACT

In a lithium transition metal oxide having a layered structure, one is provided, which is particularly excellent as a positive electrode active material of a battery on board of an electric vehicle or a hybrid vehicle in particular. A lithium transition metal oxide having a layered structure is proposed, wherein the ratio of the crystallite diameter determined by Measurement Method 1 according to the Rietveld method with respect to the mean powder particle diameter (D50) determined by the laser diffraction/scattering-type particle size distribution measurement method is 0.05 to 0.20.

14 Claims, 5 Drawing Sheets

LITHIUM TRANSITION METAL OXIDE HAVING LAYERED STRUCTURE

TECHNICAL FIELD

The present invention relates to a lithium transition metal oxide having a layered structure which can be used as a positive electrode active material of a lithium battery, and in particular, which may exert excellent capabilities as a positive electrode active material of a battery to be on board of an electric vehicle (EV: Electric Vehicle) or a hybrid electric vehicle (HEV: Hybrid Electric Vehicle).

TECHNICAL BACKGROUND

Since a lithium battery, in particular lithium secondary battery, is characterized by a large energy density, long life span and the like, it is used as a power source of home electronic products such as video cameras, portable electronic devices such as notebook-type personal computers, cellular phone and the like, and recently, is also applied to large batteries to be on board of electric vehicles (EVs), hybrid electric vehicles (HEVs) and the like.

A lithium secondary battery is a secondary battery having a structure in which, at charging time, lithium melts out from the positive electrode as an ion and moves to the negative electrode to be stored, and at discharge time, conversely, the lithium ion returns from the negative electrode to the positive electrode; the high energy density thereof is known to originate from the electric potential of the positive electrode material.

As the positive electrode active material of a lithium secondary battery, lithium transition metal oxides such as $LiCoO_2$, $LiNiO_2$ and $LiMnO_2$ having layered structure are known, in addition to lithium manganese oxide ($LiMn_2O_4$) having a spinel structure. For instance, $LiCoO_2$ has a layered structure in which lithium atom layers and cobalt atom layers are stacked alternately via an oxygen atom layer, and since the charge-discharge capacity is large and diffusibility of lithium ion storage-unstorage is excellent, the majority of the currently commercialized lithium secondary batteries use $LiCoO_2$ as a positive electrode active material, which has a high voltage of 4V. However, since Co is extremely expensive, development of lithium transition metal oxide having a layered structure ($LiMxO_2$; M: transition metal), which may be a substitution material for $LiCoO_2$, is desired.

In conventional art, as a lithium transition metal oxide having a layered structure ($LiM_xO_2$), an active substance represented by the formula $LiNi_xMn_{1-x}O_2$ (where $0.7 \leq x \leq 0.95$) is disclosed in Patent Reference 1, which is obtained by adding an alkaline solution into an aqueous mixed solution of manganese and nickel to coprecipitate manganese and nickel, adding lithium hydroxide and then firing.

In addition, a positive electrode active material represented by $Li[Li_x(A_PB_QC_R)_{1-x}]O_2$ (where A, B and C are respectively different 3 species of transition metal elements, $-0.1 \leq x \leq 0.3$, $0.2 \leq P \leq 0.4$, $0.2 \leq Q \leq 0.4$ and $0.2 \leq R \leq 0.4$) is disclosed in Patent Reference 2, comprising crystal particles of an oxide containing 3 species of transition metals, the crystal structure of the crystal particle being a layered structure, and the arrangement of the oxygen atoms constituting the oxide being cubic closest packing.

To provide a layered lithium nickel manganese complex oxide powder having high bulk density, a method for preparing a layered lithium nickel manganese complex oxide powder is disclosed in Patent Reference 3, whereby a slurry containing at least a lithium source compound, a nickel source compound and a manganese source compound, which have been ground and mixed, at a molar ratio [Ni/Mn] of nickel atom [Ni] and manganese atom [Mn] in the range of 0.7 to 9.0 is dried by spray-drying and fired to produce a layered lithium nickel manganese complex oxide powder, and then the complex oxide powder is ground.

A lithium transition metal complex oxide obtained by mixing vanadium (V) and/or boron (B) to increase the crystallite diameter is disclosed in Patent Reference 4, that is to say, a substance containing the lithium transition metal complex oxide represented by General Formula $Li_xM_YO_{Z-\delta}$ (where M represents the transition metal element Co or Ni, and the relationships $(X/Y)=0.98$ to $1.02$ and $(\delta/Z) \leq 0.03$ are fulfilled) and at the same time containing with respect to the transition metal element (M) constituting the lithium transition metal complex oxide, vanadium (V) and/or boron (B) at $((V+B)/M)=0.001$ to $0.05$ (molar ratio), the primary particle diameter thereof being 1 μm or greater, the crystallite diameter being 450 Å or greater and the lattice distortion being 0.05% or less.

With the purpose of providing a positive electrode active material for non-aqueous secondary battery comprising a primary particle that maintains a high bulk density and the battery properties without concern about a crack occurring, a positive electrode active material for non-aqueous secondary battery is proposed in Patent Reference 5, which is a lithium complex oxide in powder form of monodisperse primary particle having as main components lithium and one species of element selected from the group comprising Co, Ni and Mn, in which the mean particle diameter (D50) is 3 to 12 μm, the specific surface area is 0.2 to 1.0 $m^2/g$, the bulk density is 2.1 $g/cm^3$ or greater and the inflexion point of the rate of volume decrease by the Cooper plot method does not appear until 3 $ton/cm^2$.

[Patent Reference 1] Japanese Patent Application Laid-open No. H8-171910
[Patent Reference 2] Japanese Patent Application Laid-open No. 2003-17052
[Patent Reference 3] Japanese Patent Application Laid-open No. 2003-34536
[Patent Reference 4] Japanese Patent Application Laid-open No. 2004-253169
[Patent Reference 5] Japanese Patent Application Laid-open No. 2004-355824

Meanwhile, in contrast to batteries that are charged and discharged between the limit regions of the depth of charge-discharge as is the case for batteries of consumer products such as video cameras, notebook-type personal computers and cellular phones, since batteries that are to be on board of electric vehicles and hybrid vehicles are charged and discharged mainly in the middle region of the depth of charge-discharge (for instance, 50-80% SOC), to exhibit excellent battery properties when used in the middle region is desired of them, for instance, life span properties (cycle properties) and output properties.

SUMMARY OF THE INVENTION

The present invention relates to a lithium transition metal oxide having a layered structure and provides a novel lithium transition metal oxide allowing particularly excellent life span properties (cycle properties) and output properties to be exerted when employed as a positive electrode active material of a battery used by repeating charges and discharges mainly in the middle region of depth of charge-discharge (for instance, 50-80% SOC (State Of Charge)).

The present invention proposes a lithium transition metal oxide having a layered structure in which the ratio of the crystallite diameter as determined by the Measurement Method 1 according to the Rietveld method carried out under the conditions shown in Table 2 with respect to the mean powder particle diameter (hereinafter abbreviated as "mean particle diameter (D50)") as determined by a laser diffraction/scattering-type particle size distribution measurement method is 0.05 to 0.20.

TABLE 2

<Measurement Method 1 According to the Rietveld Method>

| | |
|---|---|
| Measurement Device | X-ray Diffractomater using Cu-Kα beam |
| Analysis Parameters | FundamentalParameter |
| Analysis Range | Diffraction Angle 2θ = 10-120° |
| Analysis Software | Topas Version3 |
| Refinement Range | Rwp <8.0, GOF <2.0 |
| (Machine Specs, Conditions, etc.) | |
| Sample disp(mm) | Refine |
| Detector | PSD |
| Detector Type | VANTEC-1 |
| High Voltage | 5616 V |
| Discr. Lower Level | 0.35 V |
| Discr. Window Width | 0.15 V |
| Grid Lower Level | 0.075 V |
| Grid Window Width | 0.524 V |
| Flood Field Correction | Disabled |
| Primary radius | 250 mm |
| Secondary radius | 250 mm |
| Receiving slit width | 0.1436626 mm |
| Divergence angle | 0.3° |
| Filament Length | 12 mm |
| Sample Length | 25 mm |
| Receiving Slit Length | 12 mm |
| Primary Sollers | 2.623° |
| Secondary Sollers | 2.623° |
| Lorentzian, 1/Cos | 0.01630098 Th |
| Det. 1 voltage | 760.00 V |
| Det. 1 gain | 80.000000 |
| Det. 1 discr. 1 LL | 0.690000 |
| Det. 1 discr. 1 WW | 1.078000 |
| Scan Mode | Continuous Scan |
| Scan Type | Locked Coupled |
| Spinner Speed | 15 rpm |
| Divergence Slit | 0.300° |
| Start | 15.000000 |
| Time per step | 1 s |
| Increment | 0.01460 |
| #steps | 7152 |
| Generator voltage | 35 kV |
| Generator current | 40 mA |

The present invention, in addition, proposes a lithium transition metal oxide having a layered structure in which the ratio of the crystallite diameter as determined by the Measurement Method 2 according to the Rietveld method carried out under the conditions shown in Table 3 with respect to the mean particle diameter (D50) as determined by a laser diffraction/scattering-type particle size distribution measurement method is 0.03 to 0.13.

TABLE 3

<Measurement Method 2 According to the Rietveld Method>

| | |
|---|---|
| Measurement Device | X-ray Diffractomater using Cu-Kα beam |
| Analysis Parameters | FundamentalParameter |
| Analysis Range | Diffraction Angle 2θ = 15-120° |
| Analysis Software | Topas Version3 |
| Refinement Range | Rwp <5.0, GOF <1.3 |

TABLE 3-continued

<Measurement Method 2 According to the Rietveld Method>

| | |
|---|---|
| (Machine Specs, Conditions, etc.) | |
| Sample disp(mm) | Refine |
| Detector | PSD |
| Detector Type | VANTEC-1 |
| High Voltage | 5616 V |
| Discr. Lower Level | 0.45 V |
| Discr. Window Width | 0.15 V |
| Grid Lower Level | 0.075 V |
| Grid Window Width | 0.524 V |
| Flood Field Correction | Disabled |
| Primary radius | 250 mm |
| Secondary radius | 250 mm |
| Receiving slit width | 0.1436626 mm |
| Divergence angle | 0.3° |
| Filament Length | 12 mm |
| Sample Length | 25 mm |
| Receiving Slit Length | 12 mm |
| Primary Sollers | 2.623° |
| Secondary Sollers | 2.623° |
| Lorentzian, 1/Cos | 0.01630098 Th |
| Det. 1 voltage | 760.00 V |
| Det. 1 gain | 80.000000 |
| Det. 1 discr. 1 LL | 0.690000 |
| Det. 1 discr. 1 WW | 1.078000 |
| Scan Mode | Continuous Scan |
| Scan Type | Locked Coupled |
| Spinner Speed | 15 rpm |
| Divergence Slit | 0.300° |
| Start | 15.000000 |
| Time per step | 1 s |
| Increment | 0.01460 |
| #steps | 7152 |
| Generator voltage | 35 kV |
| Generator current | 40 mA |

The lithium transition metal oxide having a layered structure of the present invention can be obtained for instance by mixing the raw materials, grinding with a wet grinder or the like until the mean particle diameter (D50) becomes 2 μm or smaller, then, granulating, drying, firing, as necessary classification, and then, using a percussion-type grinder with a classification mechanism or the like, finely grinding so that the ratio of the mean particle diameter (D50) to the crystallite diameter falls within a prescribed range. However, the invention is not limited to this method.

The present inventors focused on the state of the crystallite boundary surface, which is defined by the ratio of the mean particle diameter (D50) to the crystallite diameter, in a lithium transition metal oxide having a layered structure, and by defining the ratio of the mean particle diameter (D50) with respect to the crystallite diameter in the above prescribed range, a novel lithium transition metal oxide can be obtained, allowing particularly excellent life span properties (also referred to as cycle properties) and output properties (properties evaluated in low temperature capacity verification test 3 in the examples) to be exerted when employed as a positive electrode active material of a battery used by repeating charges and discharges in the middle region of the depth of charge-discharge (for instance, 50-80% SOC).

Thus, the lithium transition metal oxide having a layered structure of the present invention is particularly excellent for use as a positive electrode active material of a battery on board of, in particular, electric vehicles (EV: Electric Vehicle) and hybrid electric vehicles (HEV: Hybrid Electric Vehicle).

Note that, when stating "X to Y" (X and Y are any numbers) in the present specification, unless expressly indicated otherwise, along with the meaning of "X or greater but Y or smaller", the meanings of "preferably greater than X" and "preferably smaller than Y" are included. In addition, X and Y in such a case, are numerical values taking rounding into consideration.

BEST MODE TO CARRY OUT THE INVENTION

Figure 1:
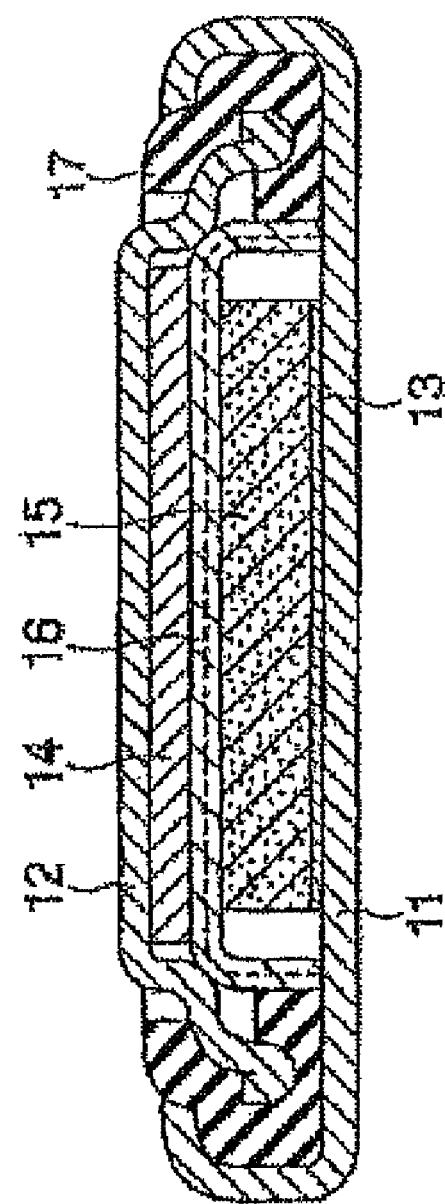
[FIG. 1] Figure showing the constitution of a type 2032 coin-type battery fabricated in order to evaluate the battery properties of the samples obtained in the Examples and Comparative Examples.

Hereinafter, embodiments of the present invention will be described; however, the present invention is not limited to the following embodiments.

The lithium transition metal oxide of the present embodiment (hereinafter referred to as "the present Li transition metal oxide") is a powder having as a main component a lithium transition metal oxide particle having a layered structure represented by General Formula $Li_{1+x}M_{1-x}O_2$ (M: transition metal). That is to say, it is a powder having as a main component a lithium transition metal oxide particle having a layered structure in which lithium atom layers and transition metal atom layers are stacked alternately via an oxygen atom layer.

Note that "having as a main component", unless expressly mentioned, includes the meaning of allowing another component to be contained to the extent that the functions of the main component are not hindered. Without specifying the content ratio of the main component, this includes cases occupying at least 50 mass % or greater, in particular 70 mass % or greater, more over 90 mass % or greater, and furthermore 95 mass % or greater (including 100%).

For instance, the present Li transition metal oxide may contain 1.0 weight % or less of $SO_4$ and 0.5 weight % or less each of other elements as impurities. The reason is that the quantities on this order are thought to have almost no influence on the properties of the present Li transition metal oxide.

The composition of the present Li transition metal oxide is not limited in particular as long as it is a composition that may form such a layered structure. The reason is, since the present invention is an invention that focuses on the ratio of the mean particle diameter (D50) to the crystallite diameter, a lithium transition metal oxide having a layered structure is thought to be able to benefit from similar effects.

However, a powder having as a main component a particle of lithium transition metal oxide represented preferably by General Formula $Li_{1+x}M_{1-x}O_2$ (M: Mn, Co and Ni), that is to say, lithium transition metal oxide containing the 3 elements Mn, Co and Ni as transition metals, is desirable.

Above all, a powder having as a main component a particle of lithium transition metal oxide represented by Formula (1) $Li_{1+x}(Mn_\alpha Co_\beta Ni_\gamma)_{1-x}O_2$ is particularly desirable.

In Formula (1), it is desirable that "1+x" is greater than stoichiometric composition, and above all 1.01 to 1.20 and in particular 1.03 to 1.10 is desirable.

In Formula (1), it is desirable that the value of a is 0.001 or greater and particularly 0.003 or greater, of which particularly 0.25 or greater; on the other hand, 0.4 or less and particularly 0.38 or less, of which particularly 0.35 or less, are desirable.

It is desirable that the value of β is 0.001 or greater and particularly 0.003 or greater, of which particularly 0.25 or greater; on the other hand, 0.4 or less and particularly 0.38 or less, of which particularly 0.35 or less, are desirable.

It is desirable that the value of y is 0.001 or greater and particularly 0.003 or greater, of which particularly 0.25 or greater; on the other hand, 0.4 or less and particularly 0.38 or less, of which particularly 0.35 or less, are desirable.

In addition, in Formula (1), it is desirable that the ratio of α, β and γ is 1:0.5 to 1.4:0.5 to 1.4 and particularly 1:0.8 to 1.2:0.8 to 1.2, of which particularly 0.95 to 1.04:0.95 to 1.04:0.95 to 1.04.

In Formula (1), although the atom ratio for the oxygen amount is described as "2" for convenience, there may be nonstoichiometry to some extent.

In the present Li transition metal oxide, it is important that the ratio of the crystallite diameter as determined by the Measurement Method 1 (refer to the examples section for details) according to the Rietveld method carried out under the conditions indicated in the above Table 2 with respect to the mean particle diameter (D50) as determined by a laser diffraction/scattering-type particle size distribution measurement method, is 0.05 to 0.20, preferably 0.05 to 0.18, and particularly preferably 0.10 to 0.15.

If the ratio is 0.05 to 0.20, particularly excellent life span properties (also referred to as cycle properties) and output properties (properties evaluated in low temperature capacity verification test 3 in the examples) can be exerted when employed as a positive electrode active material of a battery used by repeating charges and discharges in the middle region of the depth of charge-discharge (for instance, 50-80% SOC).

The above crystallite diameter can also be determined by Measurement Method 2, which is another method that is different from the above Measurement Method 1. Thus, it can also be stated that for the present Li transition metal oxide, a ratio of the crystallite diameter as determined by the Measurement Method 2 (refer to the examples section for details) according to the Rietveld method carried out under the conditions indicated in the above Table 3 with respect to the mean powder particle diameter (D50) as determined by a laser diffraction/scattering-type particle size distribution measurement method, of 0.03 to 0.13, preferably 0.03 to 0.12, and particularly preferably 0.03 to 0.11, is important.

If the ratio is 0.03 to 0.13, similarly to above, particularly excellent life span properties (also referred to as cycle properties) and output properties (properties evaluated in low temperature capacity verification test 3 in the examples) can be exerted when employed as a positive electrode active material of a battery used by repeating charges and discharges in the middle region of the depth of charge-discharge (for instance, 50-80% SOC).

Here, "crystallite" means the maximum assembly deemed a single crystal, which can be determined by carrying out XRD measurements and conducting Rietveld analyses.

The minimum unit particle constituted by a plurality of crystallites and surrounded by a particle boundary when observed by SEM (for instance 3000 times) is referred to as "primary particle" in the present invention. Thus, single crystals and multiple crystals are contained in a primary particle.

In addition, a particle in which a plurality of primary particles are aggregated by sharing a portion of their respective periphery (particle boundary) and which is independent from other particles is referred to as a "secondary particle" or "aggregated particle" in the present invention.

Meanwhile, laser diffraction/scattering-type particle size distribution measurement method is a measurement method that calculates a particle diameter by considering an aggregated powder particle as one particle (aggregated particle), and mean particle diameter (D50) means 50% volume cumulative particle diameter, that is to say the diameter at 50% accumulation from the fine side of the representation of cumulative percentage of particle diameter measurement values converted into volume in the chart of volumetric standard particle size distribution.

Similarly, 90% cumulative diameter (D90) means 90% volume cumulative particle diameter, that is to say, the diameter at 90% accumulation from the fine side of the representation of cumulative percentage of particle diameter measurement values converted into volume in the chart of volumetric standard particle size distribution.

The crystallite diameter of the present Li transition metal oxide is not limited in particular, and in the present Li transition metal oxide, the desirable range is defined based on the ratio with respect to the mean particle diameter (D50). The crystallite diameter of the present Li transition metal oxide can be adjusted, for instance, according to the composition ratio of transition metal (for instance, composition ratios such as Mn:Co:Ni ratio and Li:Mn ratio), raw material particle size, firing condition and the like.

As an approximation of the crystallite diameter of the present Li transition metal oxide, regarding the crystallite diameter determined by the Measurement Method 1 according to the Rietveld method (specifically described in the Examples section), 0.1 μm to 0.5 μm is desirable and particularly 0.15 μm to 0.45 μm, of which particularly 0.2 μm to 0.4 μm, and of which particularly 0.25 μm to 0.35 μm are desirable.

Meanwhile, regarding the crystallite diameter determined by the Measurement Method 2 according to the Rietveld method (specifically described in the Examples section), 0.01 μm to 0.50 μm is desirable and particularly 0.05 μm to 0.40 μm, of which particularly 0.05 μm to 0.30 μm, and of which particularly 0.07 μm to 0.23 μm are desirable.

The mean particle diameter of the primary particle of the present Li transition metal oxide powder is not limited in particular, and 0.5 μm to 5.0 μm is desirable and particularly 0.7 μm to 4.0 μm, of which particularly 1.0 μm to 3.0 μm is desirable.

The mean particle diameter of the primary particle can be determined by using a scanning electron microscope (HITACHI S-3500N) to observe at 20 kV acceleration voltage and 3000 times magnification, and calculating the primary particle image of the electron micrograph using a picture analysis software (analysis FIVE manufactured by OLYMPUS).

The mean particle diameter (D50) of the present Li transition metal oxide powder determined by the laser diffraction/scattering-type particle size distribution measurement method is not limited in particular, and 1.0 μm to 4.0 μm is desirable and in particular 1.5 μm to 4.0 μm, of which particularly 2.0 μm to 3.0 μm is desirable.

The 90% cumulative diameter (D90) of the present Li transition metal oxide powder determined by the laser diffraction/scattering-type particle size distribution measurement method is preferably 2.0 μm to 10.0 μm and in particular 2.5 μm to 8.0 μm, of which particularly 3.0 μm to 6.0 μm is desirable.

By adjusting the 90% cumulative diameter (D90) to 2.0 μm to 10.0 μm, that is to say, by finely adjusting the particle diameter of the coarse powder to a range of 2.0 μm to 10.0 μm, mixing of a large foreign substance particle can be prevented, thereby allowing to prevent the mixing of large foreign substance particles that mix into the positive electrode active material, in particular large foreign substance particle of metal such as iron, chromium, and zinc. Consequently, when a battery is constituted with the present Li transition metal oxide powder as the positive electrode active material, preventing the above large foreign substance particle from eluting from the positive electrode, segregating and depositing over the negative electrode, piercing the separator and internally short-circuiting becomes possible.

In addition, the present Li transition metal oxide is preferably one for which the particle size distribution curve (histogram curve) has only one peak when a chart of volumetric standard particle size distribution is determined using a laser diffraction/scattering-type particle size distribution measurement apparatus.

A specific surface area of the present Li transition metal oxide powder of 0.3 to 2.0 $m^2/g$ and particularly 0.5 to 1.5 $m^2/g$, of which particularly 0.7 to 1.3 $m^2/g$, is desirable if the specific surface area is within the range of 0.3 to 2.0 $m^2/g$, it is desirable since the output properties do not decrease due to the specific surface area being too low, and in addition, the cycle properties do not decrease by depletion of the electrolytic solution due to the specific surface area being too high.

The specific surface area can be measured by well-known BET specific surface area measurement methods using the nitrogen adsorption method.

A tap density of the present Li transition metal oxide powder of 1.4 to 2.5 $g/cm^3$ and particularly 1.5 to 2.3 $g/cm^3$, of which particularly 1.6 to 2.2 $g/cm^3$, is desirable. If the tap density is 1.4 to 2.5 $g/cm^3$, it is desirable since filling properties do not decrease remarkably, and in addition, the fluidity does not increase remarkably.

The tap density can be determined as the powder filling density when, for instance, 50 g of a sample introduced into a 150 ml glass measuring cylinder is tapped at approximately 60 mm stroke for approximately 540 times using a vibrating specific gravity meter.

It is desirable that the concentration of material attached by a magnet in the present Li transition metal oxide powder is less than 200 ppb and particularly less than 1 ppb to 200 ppb, of which particularly 5 ppb to 180 ppb, and above all particularly 10 ppb to 180 ppb.

In this case, the concentration of material attached by a magnet indicates the content ratio of magnetically-attaching components inside the present Li transition metal oxide powder, which can also be represented by the total content ratio of the magnetically-attaching components Fe, Cr and Zn.

(Preparation Method)

Hereinafter, preparation method for the present Li transition metal oxide powder will be described.

The present Li transition metal oxide powder can be obtained by mixing the raw materials, for instance a lithium salt compound, a manganese salt compound, a nickel salt compound and a cobalt salt compound, grinding with a wet grinder or the like until the mean particle diameter (D50) becomes 2 μm or smaller, then, granulating and drying by using a heat spray dryer or the like, firing, as necessary classification, then grinding by using a percussion-type grinder with a classification mechanism or the like so that the ratio of the mean particle diameter (D50) to the crystallite diameter falls within a prescribed range, further heat treating as necessary, and further classification as necessary. However, the preparation method for the lithium transition metal oxide of the present invention is not limited to such preparation method. For instance, a granulated powder to be subjected to firing can be prepared by the so-called coprecipitation method.

As lithium salt compounds, for instance, lithium hydroxide (LiOH), lithium carbonate ($Li_2CO_3$), lithium nitrate ($LiNO_3$), $LiOH.H_2O$ and lithium oxide ($Li_2O$), in addition, fatty acid lithium, lithium halide and the like, may be cited. Among these, hydroxide salt, carbonate and nitrate of lithium are desirable.

The species of manganese salt compound is not limited in particular restriction. For instance manganese carbonate, manganese nitrate, manganese chloride, manganese dioxide and the like can be used, among which manganese carbonate and manganese dioxide are desirable. Among these, electrolytic manganese dioxide obtained by electrolysis is particularly desirable.

The species of nickel salt compound is also not limited in particular and, for instance, nickel carbonate, nickel nitrate, nickel chloride, nickel oxyhydroxide, nickel hydroxide, nickel oxide and the like can be used, among which nickel carbonate, nickel hydroxide and nickel oxide are desirable.

The species of cobalt salt compound is also not limited in particular and, for instance, cobalt carbonate basic, cobalt nitrate, cobalt chloride, cobalt oxyhydroxide, cobalt hydroxide, cobalt oxide and the like can be used, among which cobalt carbonate basic, cobalt hydroxide, cobalt oxide and cobalt oxyhydroxide are desirable.

It is desirable that mixing of raw materials is by adding and wet mixing liquid media such as water and dispersant for slurrying, and it is desirable that the obtained slurry is ground with a wet grinder. However, dry grinding is also adequate.

Then, it is desirable to grind until the mean particle diameter (D50) becomes 2 μm or smaller, and particularly to 0.5 μm to 1.0 μm mean particle diameter (D50).

The granulation method may be wet-type or dry-type as long as the various raw materials ground in the previous step are dispersed within the granule particles without being segregated, and may be extrusion granulation method, tumbling granulation method, fluid granulation method, mix granulation method, spray drying granulation method, pressure forming granulation method, or flake granulation method using a roll or the like. However, when wet-type granulation has been carried out, it is necessary to dry thoroughly prior to firing. As drying methods, drying may be by well-known drying methods such as spray hot drying method, hot air drying method, vacuum drying method and freeze-drying method, among which spray hot drying method is desirable. Spray hot drying method is carried out preferably using a hot spray dryer (spray dryer).

Firing is preferably carried out by maintaining in a firing oven, under air atmosphere, under oxygen gas atmosphere, under an atmosphere in which oxygen partial pressure has been adjusted, or under carbon dioxide gas atmosphere, or under other atmosphere, at temperatures of 850 to 1100° C. (meaning the temperature when a thermocouple is brought into contact with the object to be fired inside the firing oven) for 0.5 to 30 hours. In so doing, it is desirable to select firing conditions for which the transition metal is solid-soluble at the atomic level, demonstrating a single phase.

The type of firing oven is not limited in particular. Firing is possible using, for instance, a rotary kiln, a static oven, or other firing ovens.

Classification after firing has the technical significance of adjusting the particle size distribution of the aggregated powder along with eliminating foreign matters, and classification so as to have a mean particle diameter (D50) of 10 μm to 50 μm is desirable.

Grinding after classification is preferably by finely grinding using a classification mechanism-fitted percussion-type grinder, for instance, classification rotor-fitted counter jet mill or the like, so that the ratio of the mean particle diameter (050) to the crystallite diameter falls within a prescribed range.

More preferably, grinding may be carried out so that the particle size distribution curve (histogram curve) of the powder becomes only one peak. That is to say, grinding is desirable in such a way that by measuring the particle size distribution for the obtained powder according to the laser diffraction/scattering-type particle size distribution measurement method, the obtained volumetric standard particle size frequency distribution curve (histogram curve) demonstrates a particle size distribution curve having one peak. In this case, "peak" in the volumetric standard particle size distribution curve (histogram curve) refers to a point where the slope of the frequency distribution curve representing the volumetric standard particle size frequency distribution (histogram) changes from positive to negative when seen from the side where the particle size is small to the side where it is large. Note that, should a peak having a peak top of less than 0.5% frequency in the volumetric standard particle size frequency distribution exist even hypothetically, the influence thereof being negligible, such a peak is not included in the peaks that are subjects of the present invention.

The powder particles obtained by grinding with a classification mechanism-fitted percussion-type grinder are normally non-spherical.

Heat treatment is preferably conducted under air atmosphere, under an environment of 300° C. to 700° C. and preferably 600° C. to 700° C., for 0.5 to 20 hours. In so doing, if at a lower temperature than 300° C., the effects of the heat treatment are difficult to obtain, and the fine powder risk remaining without sintering; on the other hand, if heat treating at a higher temperature than 700° C., sintering begins and the powder properties that are the object of the present invention cannot be obtained.

Classification after heat treatment has the technical significance of adjusting the particle size distribution of the aggregated powder along with eliminating foreign matters, and classification in a range of 1.0 μm to 4.0 μm mean particle diameter (D50) is desirable.

(Properties and Applications)

After crushing and classification as necessary, the present Li transition metal oxide powder can be used effectively as a lithium positive electrode active material of a battery.

For instance, a positive electrode mixed material can be prepared by mixing the present Li transition metal oxide powder, an electrical conducting material comprising carbon black or the like and a tying agent comprising Teflon (Teflon is a registered trade mark from U.S. DUPONT) binder or the like. Then, a lithium secondary battery can be constructed using such a positive electrode combination for the positive electrode, for instance, using a material capable of storing-unstaring lithium such as lithium or carbon for the negative electrode, and using a lithium salt such as lithium phosphate hexafluoride ($LiPF_6$) dissolved in a mixed solvent such as ethylene carbonate-dimethyl carbonate for the non-aqueous electrolyte. However, limitation to a battery having such a constitution is not meant.

Since a lithium battery provided with the present Li transition metal oxide powder as a positive electrode active material exerts both excellent life span properties (cycle properties) and output properties when used by repeating charges and discharges in the middle region of depth of charge-discharge (for instance, 50-80% SOC), application is particularly excellent in lithium positive electrode active material for batteries used as motor driving power sources in particular on board of electric vehicles (EV: Electric Vehicle) and hybrid electric vehicles (HEV: Hybrid Electric Vehicle).

Note that a "hybrid vehicle" is a vehicle in which two power sources, an electric motor and an internal combustion engine, are applied in combination.

In addition, "lithium battery" is meant to include all batteries containing lithium or lithium ion within the battery, such as, lithium primary battery, lithium secondary battery, lithium ion secondary battery and lithium polymer battery.

EXAMPLES

Hereinafter, the present invention will be explained further based on examples and comparative examples; however, the present invention is not limited to the examples shown below.

<Crystallite Diameter Measurement Method 1 According to the Rietveld Method>

The Rietveld method is a method whereby the structure parameters of a crystal are refined from the diffracted intensities obtained by powder x-ray diffraction or the like. It is a technique in which a crystal structure model is hypothesized, and, so as to match as much as possible the x-ray diffraction pattern derived by calculation from the structure thereof and the x-ray diffraction pattern measured actually, the various parameters of the crystal structure thereof are refined.

In the Measurement Method 1 according to the Rietveld Method, the crystallite diameters of the samples (powders) obtained in the examples and comparative examples were measured using an x-ray diffractometer (D8 ADVANCE manufactured by Bruker AXS K. K.), which uses a Cu-Kα beam. X-ray diffraction patterns obtained from a range of diffraction angles 2θ=10 to 120° were used to carry out measurements using the analysis software Topas Version 3. In addition, FundamentalParameter was adopted to carry out the analyses.

It was hypothesized that the crystal structure belonged 100% to the space group R3-m, the 3a sites thereof were occupied by Li, the 3b sites were occupied by Mn, Co, Ni and excess Li fraction x and the 6c sites were occupied by O, and refinements were carried out until Rwp<8.0 and GOF<2.0, with the site occupancy (Occ.) of oxygen and isotropic temperature factor (Beq.; isotropic temperature factor) as variables.

As refinement procedures, the following operations (1) to (3) were performed sequentially in a state where the z coordinates and site occupancies of the oxygens served as variables.
(1) Refinement with only the isotropic temperature factors of the 3b sites as variables.
(2) Refinement with only the isotropic temperature factors of the 6c sites as variables.
(3) Refinement with only the isotropic temperature factors of the 3a sites as variables.

The above procedures (1) to (3) were carried out iteratively until each variable no longer varied.

Thereafter, the z coordinates and site occupancies of the oxygens were returned to fixed values, and refinements were carried out iteratively in a state where the crystallite size (Gauss) and the crystal distortion (Gauss) served as variables, until there was no variation in the numerical values, to determine the crystallite size (Gauss).

Note that the instrument specifications, conditions and the like, used in other measurements and Rietveld method analyses were as follows.
Sample disp (mm): Refine
Detector: PSD
Detector Type: VANTEC-1
High Voltage: 5616V
Discr. Lower Level: 0.35V
Discr. Window Width: 0.15V
Grid Lower Level: 0.075V
Grid Window Width: 0.524V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.01630098 Th
Det.1 voltage: 760.00V
Det.1 gain: 80.000000
Det.1 discr.1 LL: 0.690000
Det.1 discr.1 WW: 1.078000
Scan Mode: Continuous Scan
Scan Type: Locked Coupled
Spinner Speed: 15 rpm
Divergence Slit: 0.300°
Start: 15.000000
Time per step: 1 s
Increment: 0.01460
steps: 7152
Generator voltage: 35 kV
Generator current: 40 mA <Crystallite Diameter Measurement 2 According to the Rietveld Method>

In the Measurement Method 2 according to the Rietveld Method, the crystallite diameters of the samples (powders) obtained in the examples and comparative examples were measured using an x-ray diffractometer (D8 ADVANCE manufactured by Bruker AXS K.K.), which uses a Cu-Kα beam. In so doing, FundamentalParameter was adopted to carry out the analyses. X-ray diffraction patterns obtained from a range of diffraction angles 2θ=15 to 120° were used to carry out measurements using the analysis software Topas Version 3.

It was hypothesized that the crystal structure belonged to Trigonal from the space group R3-m, the 3a sites thereof were occupied by Li, the 3b sites were occupied by Mn, Co, Ni and excess Li fraction x and the 6c sites were occupied by O, and refinements were carried out until Rwp<5.0 and GOF<1.3, with the site occupancy (Occ.) of oxygen and isotropic temperature factor (Beq.; isotropic temperature factor) as variables.

Note that the above-mentioned Rwp and GOF are values that are determined by the following formula (refer to "A Practical Guide to X-Ray Powder Analysis" The Japan Society for Analytical Chemistry, X-ray Analysis Investigation Discussion Group Ed. Published by Asakura Publishing Co., Ltd. Feb. 10, 2002. p 107, Table 6.2).

$$Rwp = [\Sigma_i wi\{yi - fi(x)^2\}/\Sigma_i wiyi^2]^{1/2}$$

$$Re = [(N-P)/\Sigma_i wiyi^2]^{1/2}$$

$$GOF = Rwp/Re$$

where wi represents the statistical weight, yi the observed intensity, fi(x) the theoretical diffracted intensity, N the total number of data points, and P the number of parameters to be refined.

As refinement procedures, the following operations (1) to (3) were performed sequentially in a state where the z coordinates and site occupancies of the oxygen served as variables.
(1) Refinement with only the isotropic temperature factors of the 3b sites as variables.
(2) Refinement with only the isotropic temperature factors of the 6c sites as variables.
(3) Refinement with only the isotropic temperature factors of the 3a sites as variables.

The above procedures (1) to (3) were carried out iteratively until each variable no longer varied.

Thereafter, the z coordinates and site occupancies of the oxygen were returned to fixed values, and refinements were carried out iteratively in a state where the crystallite size (Gauss) and the crystal distortion (Gauss) served as variables, until there was no variation in the numerical values, to determine the crystallite size (Gauss).

The instrument specifications, conditions and the like, used in other measurements and Rietveld method analyses were as follows.

Sample lisp (mm): Refine
Detector: PSD
Detector Type: VANTEC-1
High Voltage: 5616V
Discr. Lower Level: 0.45V
Discr. Window Width: 0.15V
Grid Lower Level: 0.075V
Grid Window Width: 0.524V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.01630098 Th
Det.1 voltage: 760.00V
Det.1 gain: 80.000000
Det.1 discr.1 LL: 0.690000
Det.1 discr.1 WW: 1.078000
Scan Mode: Continuous Scan
Scan Type: Locked Coupled
Spinner Speed: 15 rpm
Divergence Slit: 0.300°
Start: 15.000000
Time per step: 1 s
Increment: 0.01460
steps: 7152
Generator voltage: 35 kV
Generator current: 40 mA <Measurement of Mean Particle Diameter (D50) and 90% Cumulative Diameter (D90)>

The particle size distribution was measured for the samples (powders) obtained in the examples and comparative examples as follows.

Using a sample circulator ("Microtrac ASVR" manufactured by Nikkiso Co. Ltd.) for laser diffraction particle size distribution meter, sample (powder) was introduced in an aqueous solvent, while at a flow rate of 40 mL/sec, 40 watts ultrasound was emitted for 360 seconds, then, the particle size distribution was measured using a laser diffraction particle size distribution meter "HRA (X100)" manufactured by Nikkiso Co. Ltd. to determine D50 and D90 from the obtained chart of volumetric standard particle size distribution.

Note that when measuring, water passed through a 60 μm filter was used for the aqueous solvent, the solvent refractive index was 1.33, the particle transparency condition was reflective, the measurement range was 0.122 to 704.0 μm, the measurement time was 30 seconds and the mean value of value measured twice was used as the measurement value.

Figure 2:
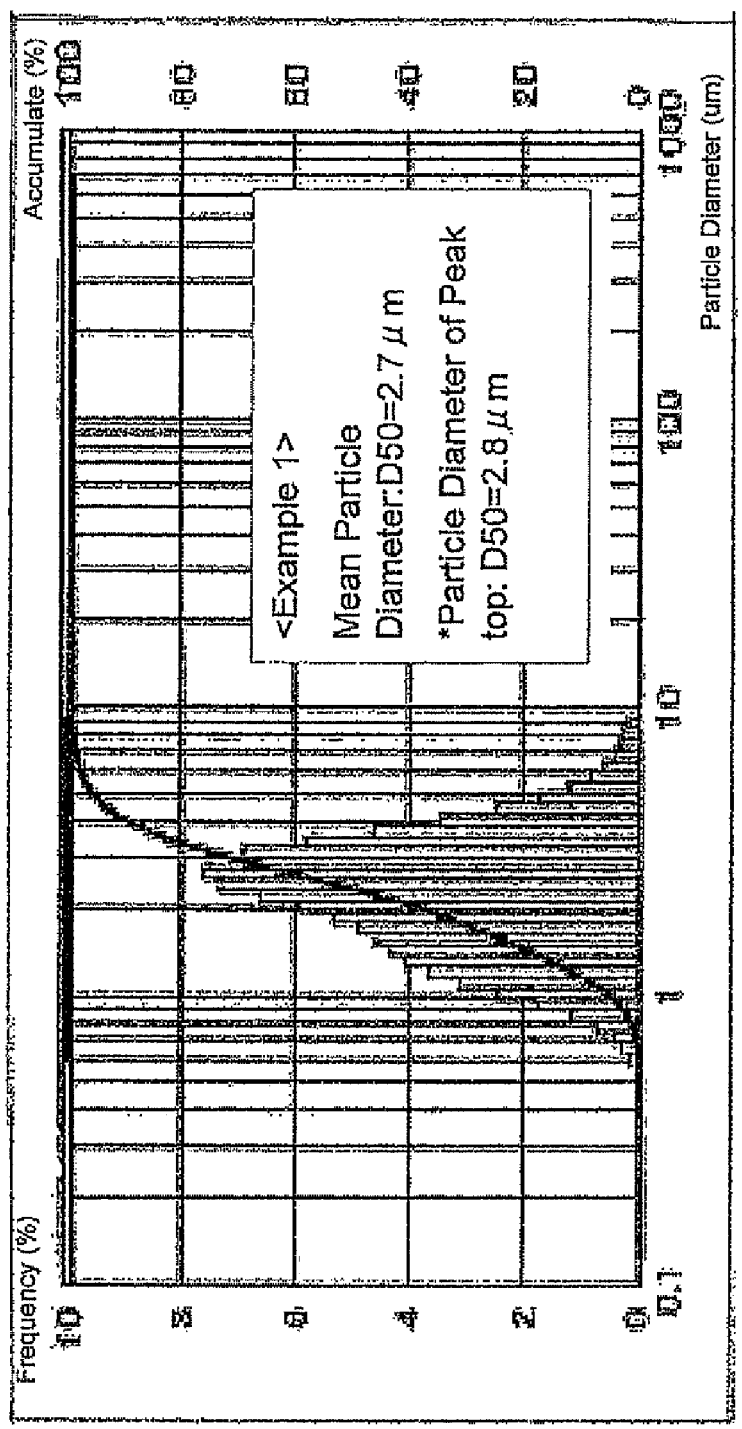
[FIG. 2] Chart of the volumetric standard particle size distribution for a lithium transition metal oxide powder (sample) obtained in Example 1.
Figure 3:
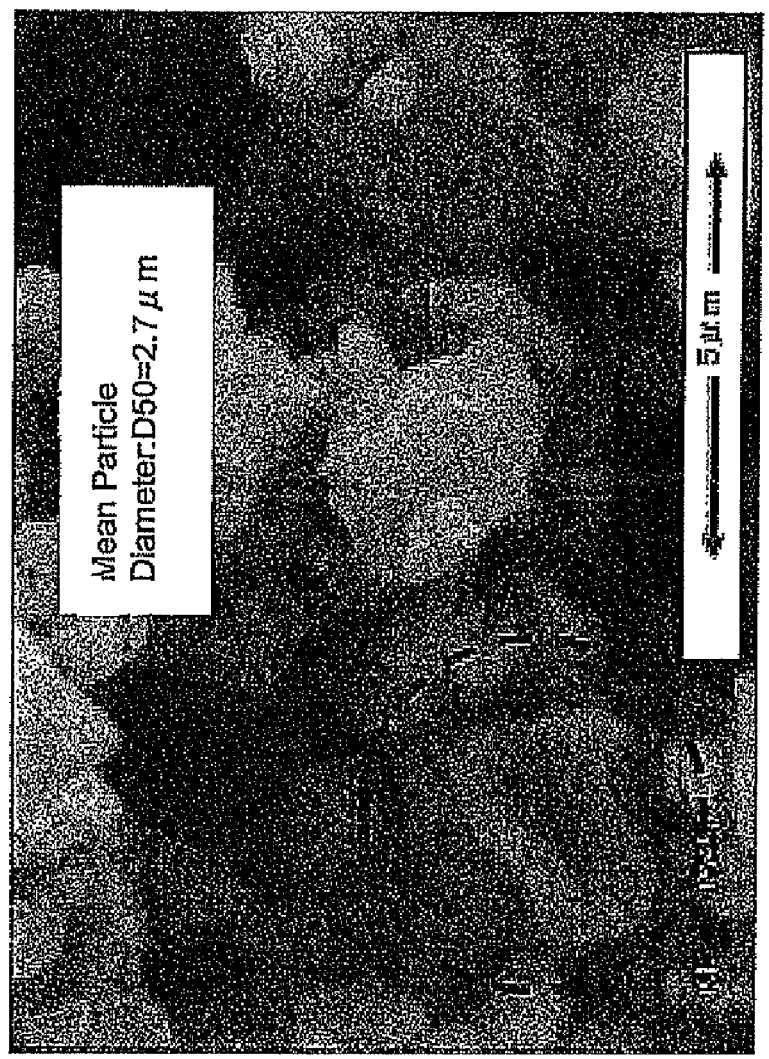
[FIG. 3] SEM photograph of a lithium transition metal oxide powder (sample) obtained in Example 1.
Figure 4:
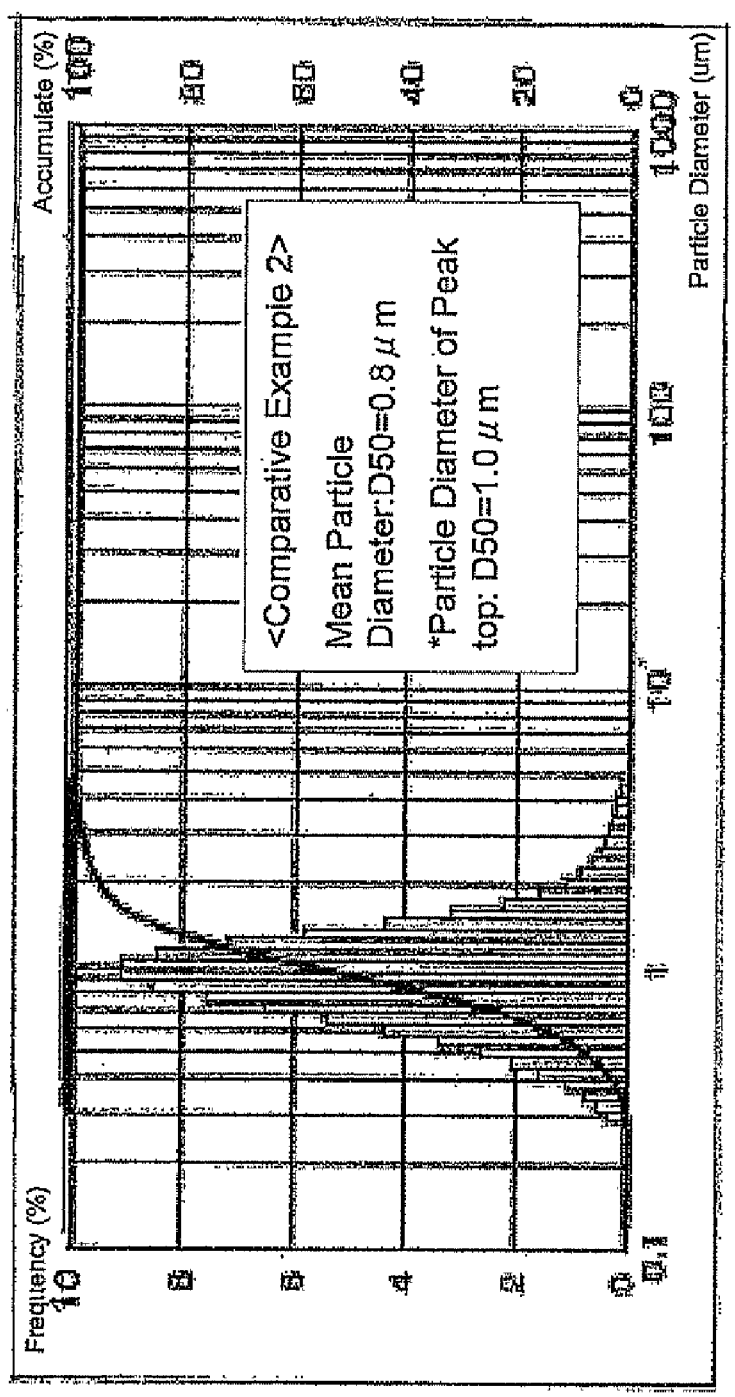
[FIG. 4] Chart of the volumetric standard particle size distribution for a lithium transition metal oxide powder (sample) obtained in Comparative Example 2.
Figure 5:
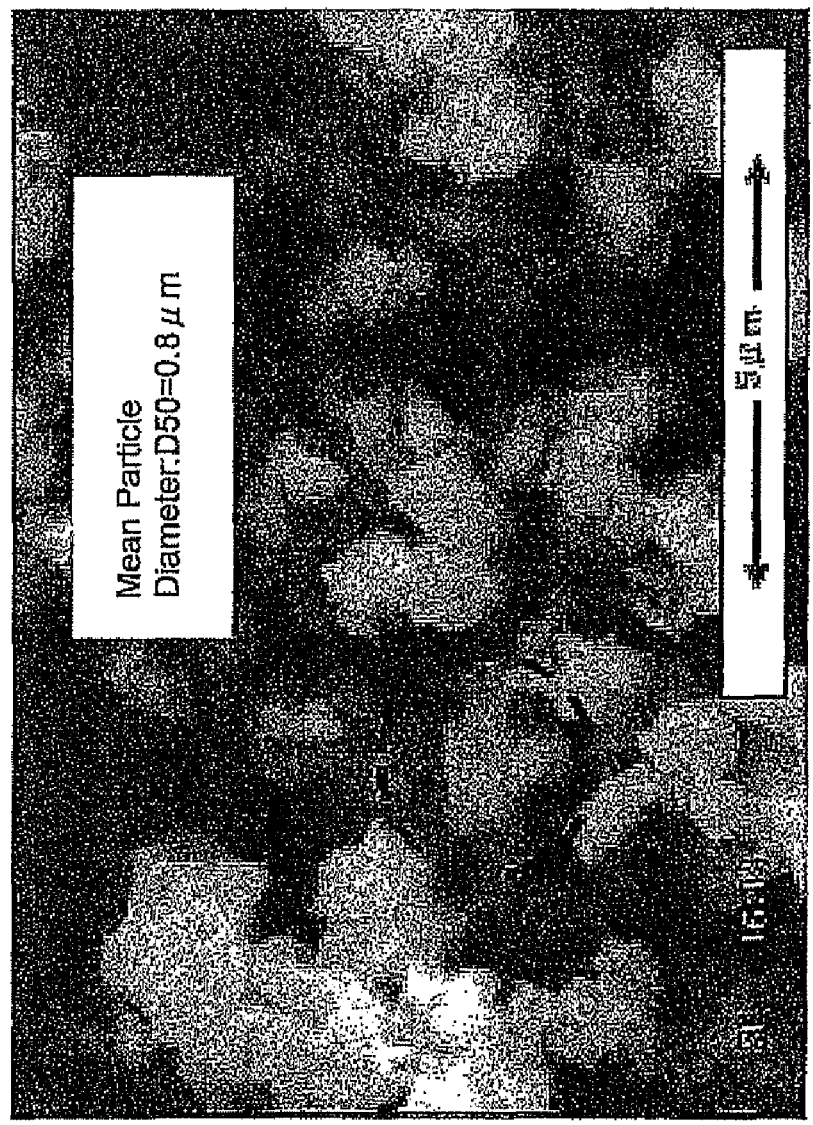
[FIG. 5] SEM photograph of a lithium transition metal oxide powder (sample) obtained in Comparative Example 2.

Note that, regarding the mean particle diameter (D50) determined by the laser diffraction/scattering-type particle size distribution measurement method, the value thereof can be estimated from such picture data as an SEM picture, at least in the case of a lithium transition metal oxide powder such as of the present invention. Here, the particle size distribution chart of the volumetric standard particle size distribution, obtained by measuring with a laser diffraction particle size distribution meter, of the sample (mean particle diameter D50=2.3 μm) obtained in Example 1 and the SEM picture thereof (magnification: 10,000-fold) are shown in FIG. 2 and FIG. 3, and the particle size distribution chart of the volumetric standard particle size distribution, obtained by measuring with a laser diffraction particle size distribution meter, of the sample (mean particle diameter D50=0.9 μm) obtained in Comparative Example 2 and the SEM picture thereof (magnification: 10,000-fold) are shown in FIG. 4 and FIG. 5. As is clear by comparing these FIGS. 2-5, the particle diameter of the largest primary particle that can be identified with the SEM image matches approximately the mean particle diameter (D50) as determined with the laser diffraction particle size distribution meter. Thus, the mean particle diameter (D50) determined by the laser diffraction/scattering-type particle size distribution measurement method can be determined alternatively by measuring the particle diameter of the largest primary particle in the SEM image.

In addition, although a sample, when collected from an electrode, is a mixture containing electrical conducting materials or the like, if dispersed thoroughly by applying ultrasound for 360 seconds or longer as described above, the particle diameter at the peak top of the chart of the volumetric standard particle size distribution obtained by measurement using a laser diffraction particle size meter has been confirmed to match approximately the mean particle diameter (D50) of the lithium transition metal oxide powder in use.

<Specific Surface Area Measurement (BET method)>

The specific surface area of the samples (powders) obtained in the examples and comparative examples were measured as follows.

First, 0.5 g of sample (powder) was weighed in a glass cell for MONOSORB LOOP ("MS-18", manufactured by Yuasa Ionics Inc.), a specific surface area measurement device by the flow gas adsorption method, the interior of the glass cell was substituted with nitrogen gas for 5 minutes with a gas amount of 30 mL/min in a pretreatment device for the MONOSORB LOOP, and then heat treatment was carried out at 250° C. for 10 minutes in the nitrogen gas atmosphere.

Thereafter, the sample (powder) was measured by the BET one point method using the MONOSORB LOOP.

Note that the adsorption gas used during the measurement was a mixed gas of 30% nitrogen: 70% helium.

<Tap Density Measurement>

Introduced into a 150 ml glass measuring cylinder was 50 g of sample (powder) obtained in the examples and comparative examples, and a vibrating specific gravity meter (KRS-409 manufactured by Kuramochi Kagaku Kikai Seisakusho) was used to determine the powder filling density when tapped 540 times with a stroke of 60 mm.

<Measurement Method for the Material Attached by a Magnet Concentration>

Measurement of material attached by a magnet concentration was carried out by adopting the method in which, referring to the methods described in paragraphs [0010]-[0021] of Japanese Patent Application Laid-open No. 2004-165156, while slurrying the sample (powder) obtained in the examples and comparative examples, a magnet coated with tetrafluoroethylene was introduced into the slurry to attach the materials attached by a magnet to the magnet, then, referring to JIS G 1258:1999, the materials attached by a magnet attached to the magnet were acid-dissolved to quantify the material attached by a magnet. The description will be detailed in the following.

Note that since the materials attached by a magnet attached to the magnet are in small amounts, immersion into an acidic solution altogether with the magnet is necessary to acid-dissolve the materials attached by a magnet. Thus, a magnet coated with tetrafluoroethylene was used for the magnet.

Into a 1000 cc polypropylene pot, 100 g of lithium transition metal oxide powder (sample) was introduced, 500 cc of ion exchanged water and a 450-600 mT magnet coated with tetrafluoroethylene were introduced, the pot was placed on a ball mill rotation stand and rotated at a pre-adjusted rotation speed of 60 rpm for 30 minutes. Next, the magnet was taken out, placed into a 100 mL beaker to be immersed in ion exchanged water and washed with an ultrasonic cleaner (model US-205 manufactured by SND Co., LTD.) set to two-frequency output switching for 3 minutes to eliminate excess powder attached to the magnet. Exchange of the ion exchanged water immersing the magnet and washing with ultrasound were repeated 8 times. Thereafter, the magnet was taken out, placed into a 50 mL measuring cylinder, immersed in an amount of aqua regia (liquid in which concentrated hydrochloric acid and concentrated nitric acid were mixed at a volume ratio of 3:1) that submerged completely the magnet, and the material attached by a magnet was dissolved by heating in aqua regia at 80° C. for 30 minutes. The magnet was taken out from aqua regia, and the aqua regia in which material attached by a magnet was dissolved was diluted with ion exchanged water. The diluted aqua regia was analyzed by ICP to quantify Fe, Cr and Zn, the value of the sum of the quantification values of these 3 elements was calculated as the amount of materials attached by a magnet, and the amount of materials attached by a magnet per sample weight was calculated as the material attached by a magnet concentration.

<Battery Evaluation>

Introduced and mixed in a mortar were 8.0 g of sample (powder) obtained in the examples and comparative examples, 1.0 g of acetylene black (manufactured by Denki Kagaku Kogyo Kabushiki Kaisha) as an electrical conducting material, and 1.0 g of Teflon binder (PVDF; note that Teflon is a registered trade mark of U.S. DUPONT) as a binder, which were mixed with 5 mL of N-methyl-2-pyrrolidone (NMP), kneaded and brought into a paste form using a planetary stirring and defoaming device (Mazerustar KK-50S manufactured by Kurabo Industries LTD.).

An aluminum foil was coated over with this paste using a Baker-type applicator with a clearance of 350 µm, dried, punched out with a 14 mmØ punch and then pressed with a pressure of 4 t/cm$^2$ to be turned into a positive electrode plate. Note that when the weight of the positive electrode plate and the weight of aluminum foil alone punched out with a 14 mmØ punch were subtracted to calculate the sample weight from the above mix weight ratio, the weight of the sample within one positive electrode plate was 0.04 g.

Using a 16 mmØ 0 0.5 mm thick Li metal for the negative electrode and using 1M-LiPF$_6$/EC+DMC (3:7 vol ratio) for the electrolytic solution, the coin cell battery of FIG. 1 was created to carry out following cycle tests.

In Cycle Test 1, charging-discharging was repeated 30 times with the electrode potential in the range of 3.0V to 4.3V, at 45° C. The ratio of the discharge capacity after 30 cycles with respect to the discharge capacity at the third cycle was taken as the cycle preservation rate, which was evaluated with a relative value when the cycle preservation rate of Comparative Example 1 was taken as 100. Charging-discharging was performed with a constant current value corresponding to 0.2 C rate. Note that, by taking the current value for charging-discharging the total capacity of the battery over one hour as 1 C rate, C rate represents how many times this rate the current value is, at which the battery is charging-discharging. Charging-discharging at a current value of 0.2 times 1 C rate is meant by 0.2 C rate, representing the current value for charging-discharging the total battery capacity in 5 hours.

In Cycle Test 2, charging-discharging was repeated 30 times with a range of SOC: 50 to 80%, at 45° C. The ratio of the discharge capacity after 30 cycles with respect to the discharge capacity at the third cycle was taken as the cycle preservation rate, which was evaluated with a relative value when the cycle preservation rate of Comparative Example 1 was taken as 100. Here, SOC means depth of charge, 80% SOC means a state of charge amount of 80% the charge capacity when charging was from the open voltage to 4.1V with a current value of 0.2 C and then charging was with a constant voltage of 4.3V, at 25° C.

In the Low Temperature Capacity Verification Test 3, a charge-discharge cycle was repeated, charging-discharging at a constant current of 1 C rate in a range of 3.0 to 4.3V, at 0° C., the discharge capacity at the third cycle thereof was measured and evaluated as a relative value by taking the third cycle discharge capacity of Comparative Example 1 as 100.

The coin cell battery of FIG. 1 will be described.

Inside a positive electrode case 11 made of organic electrolytic solution-resistant stainless steel, a collector 13 also made of stainless steel is spot welded. A positive electrode 15 comprising the above positive electrode composite is crimped on the top surface of this collector 13, a separator 16 made of a microporous polypropylene resin impregnated with an electrolytic solution is placed on the top surface of this positive electrode 15. A closing lid 12 joined below to a negative electrode 14 comprising metal Li is located at the opening of the positive electrode case by sandwiching a gasket 17 made of polypropylene, the battery being sealed by this. The closing lid 12 doubles as a negative electrode terminal, and is made of stainless similarly to the positive electrode case.

The diameter of the battery was 20 mm and the total height of the battery was 3.2 mm. The electrolytic solution used was one in which ethylene carbonate and 1,3-dimethoxy carbonate mixed in a proportion of 3:7 in volume ratio served as a solvent and 1 moL/L of LiPF$_6$ was dissolved in this solvent as solute.

Example 1

Lithium carbonate having a mean particle diameter (D50) of 8 µm, electrolytic manganese dioxide having a mean particle diameter (D50) of 22 µm, nickel hydroxide having a mean particle diameter (D50) of 25 µm and cobalt oxyhydroxide having a mean particle diameter (D50) of 14 µm were weighed so as to have Li:Mn:Ni:Co=1.06:0.31:0.31:0.32 in molar ratio, water was added for mixing and stirring to prepare a slurry having a concentration in solid fraction of 50 wt %.

The obtained slurry (20 kg of raw material powder) was added with an ammonium salt of polycarboxylic acid (SN dispersant 5468, manufactured by San Nopco Limited) as dispersant to 6 wt % of the solid fraction of the slurry, ground with a wet grinder at 1300 rpm for 29 minutes to have a mean particle diameter (D50) of 0.7 μm.

The obtained ground slurry was granulation-dried using a heat spray dryer (spray dryer OC-16, manufactured by Ohkawara Kakohki Co., Ltd.). In so doing, granulation-drying was carried out using a rotating disc for spraying, at 21000 rpm rotation speed, 24 kg/hr slurry supply amount, and adjusting the temperature to be 100° C. drying tower exit temperature.

The obtained granulated powder was fired in an atmosphere at 975° C. for 20 hours using a static electric oven. The fired powder obtained by firing was sorted with a sieve having 75 μm openings, the powder under the sieve was ground to obtain a lithium transition metal oxide powder (sample) using a percussion-type grinder fitted with a classification mechanism (counter jet mill "100AFG/50ATP" manufactured by Hosokawa Micron), under the conditions: classification rotor rotation speed: 14900 rpm; grinding air pressure: 0.6 MPa; grinding nozzle Ø: 2.5 3 used; and powder supply amount: 4.5 kg/h.

When the chart of volumetric standard particle size distribution for the obtained lithium transition metal oxide powder (sample) was determined using, similarly to above, a laser diffraction particle size distribution meter ("Microtrac ASVR•HRA (X100)" manufactured by Nikkiso Co. Ltd.) the particle size distribution had only one peak. That is to say, the inflection point of the derivative was one point.

Note that, the mean particle diameter (D50) of each raw material was the value of D50 obtained from the chart of volumetric standard particle size distribution obtained using, similarly to above, a laser diffraction particle size distribution meter ("Microtrac ASVR•HRA (X100)" manufactured by Nikkiso Co. Ltd.).

Example 2

The lithium transition metal oxide powder obtained in Example 1 was placed in the environment of an atmosphere at 650° C. for 10 hours for heat treatment, sorted with a sieve having 250 μm openings and the sieve bottom was recovered in order to obtain a lithium transition metal oxide powder (sample).

When the chart of volumetric standard particle size distribution for the obtained lithium transition metal oxide powder (sample) was determined using, similarly to above, a laser diffraction particle size distribution meter ("Microtrac ASVR•HRA (X100)" manufactured by Nikkiso Co. Ltd.) the particle size distribution had only one peak.

Example 3

A lithium transition metal oxide powder (sample) was obtained by processing similarly to Example 2 except that lithium carbonate having a mean particle diameter (D50) of 8 μm, electrolytic manganese dioxide having a mean particle diameter (D50) of 22 μm, nickel hydroxide having a mean particle diameter (D50) of 25 μm and cobalt oxyhydroxide having a mean particle diameter (D50) of 14 μm were weighed so as to have Li:Mn:Ni:Co=1.07:0.30:0.32:0.31 in molar ratio, and the firing temperature was 960° C.

When the chart of volumetric standard particle size distribution for the obtained lithium transition metal oxide powder (sample) was determined using, similarly to above, a laser diffraction particle size distribution meter ("Microtrac ASVR•HRA (X100)" manufactured by Nikkiso Co. Ltd.) the particle size distribution had only one peak.

Example 4

A lithium transition metal oxide powder (sample) was obtained by processing similarly to Example 2 except that lithium carbonate having a mean particle diameter (D50) of 8 μm, electrolytic manganese dioxide having a mean particle diameter (D50) of 22 μm, nickel hydroxide having a mean particle diameter (D50) of 25 μm and cobalt oxyhydroxide having a mean particle diameter (D50) of 14 μm were weighed so as to have Li:Mn:Ni:Co=1.05:0.31:0.32:0.32 in molar ratio, the firing temperature was 950° C. and the heat treatment temperature was 600° C.

When the chart of volumetric standard particle size distribution for the obtained lithium transition metal oxide powder (sample) was determined using, similarly to above, a laser diffraction particle size distribution meter ("Microtrac ASVR•HRA (X100)" manufactured by Nikkiso Co. Ltd.) the particle size distribution had only one peak.

Example 5

Lithium carbonate having a mean particle diameter (D50) of 8 μm, manganese sulfate.pentahydrate, nickel sulfate.hexahydrate and cobalt sulfate.heptahydrate were weighed so as to have Li:Mn:Ni:Co=1.01:0.33:0.33:0.33 in molar ratio.

Introduced into a 10 L sealed container (fitted with an oil jacket) was 2.5 L of city water, the above manganese sulfate.pentahydrate, nickel sulfate.hexahydrate and cobalt sulfate.hexahydrate were added thereto and dissolved, and water was added for adjustment so as to obtain 4 L.

Aqueous ammonia of 25 wt % (manufactured by Agata Yakuhin Kogyo Sha), and an aqueous solution of 6 mol/L caustic soda were added into the above container while this solution was being stirred to be adjusted to pH 11.5 using a pH-meter. The bath temperature was maintained at 45° C. and stirring was carried out for 12 hours. The precipitate after stirring was decantation and washing were repeated until the electric conductivity of the supernatant reached 1 mS or less, thereafter, the reaction solution was solid-liquid separated by filtration and the solid fraction was dried at 120° C. for 10 hours to obtain a metal hydroxide raw material.

The above lithium carbonate was added to the obtained metal hydroxide raw material, mixed thoroughly with a ball mill to obtain a raw material mixed powder, and this raw material mixed powder was fired in an atmosphere of 900° C. for 20 hours to obtain a fired powder.

The obtained fired powder was sorted with a sieve having 75 μm openings, the powder under the sieve was ground to obtain a lithium transition metal oxide powder (sample) using a percussion-type grinder fitted with a classification mechanism (counter jet mill "100AFG/50ATP" manufactured by Hosokawa Micron), under the conditions of 14900 rpm classification rotor rotation speed, 0.6 MPa grinding air pressure, 2.5 grinding nozzle Ø 3 used, and 4.5 kg/h powder supply amount.

The obtained powder was placed in the environment of an atmosphere at 650° C. for 10 hours for heat treatment, sorted with a sieve having 250 μm openings and the sieve bottom was recovered to obtain a lithium transition metal oxide powder (sample).

Comparative Example 1

A lithium transition metal oxide powder (sample) was obtained by carrying out firing, classification, heat-treatment and classification similarly to Example 5, except that lithium carbonate, manganese sulfate.pentahydrate, nickel sulfate.hexahydrate and cobalt sulfate.hexahydrate were weighed so as to have Li:Mn:Ni:Co=1.01:0.33:0.33:0.33 in molar ratio and then no grinding using a percussion-type grinder fitted with a classification mechanism was carried out.

Comparative Example 2

A lithium transition metal oxide powder (sample) was obtained by carrying out wet-type grinding, dry granulation, firing and classification similarly to Example 1, except that lithium carbonate having a mean particle diameter (D50) of 8 μm, electrolytic manganese dioxide having a mean particle diameter (D50) of 22 μm, nickel hydroxide having a mean particle diameter (D50) of 25 μm and cobalt oxyhydroxide having a mean particle diameter (D50) of 14 μm were weighed so as to have Li:Mn:Ni:Co=1.07:0.31:0.31:0.31 in molar ratio, and then grinding was carried out using a pin mill manufactured by Tokyo Nara Seizo instead of a percussion-type grinder fitted with a classification mechanism.

Comparative Example 3

A lithium transition metal oxide powder (sample) was obtained by carrying out wet-type grinding, dry granulation, firing and classification similarly to Example 1, except that lithium carbonate having a mean particle diameter (D50) of 8 μm, electrolytic manganese dioxide having a mean particle diameter (D50) of 22 μm, nickel hydroxide having a mean particle diameter (D50) of 25 μm and cobalt oxyhydroxide having a mean particle diameter (D50) of 14 μm were weighed so as to have Li:Mn:Ni:Co=1.05:0.31:0.32:0.32 in molar ratio and then no grinding using a percussion-type grinder fitted with a classification mechanism was carried out.

TABLE 1

| $Li_{1+x}(Mn_\alpha Co_\beta Ni_\gamma)_{1-x}O_2$ | Example 1 | Example 2 | Example 3 | Example 4 | Example 5 | Comparative Example 1 | Comparative Example 2 | Comparative Example 3 |
|---|---|---|---|---|---|---|---|---|
| 1 + x(Li) | 1.06 | 1.06 | 1.07 | 1.05 | 1.01 | 1.01 | 1.07 | 1.05 |
| α(Mn) | 0.31 | 0.31 | 0.30 | 0.31 | 0.33 | 0.33 | 0.31 | 0.31 |
| β(Co) | 0.31 | 0.31 | 0.32 | 0.32 | 0.33 | 0.33 | 0.31 | 0.32 |
| γ(Ni) | 0.32 | 0.32 | 0.31 | 0.32 | 0.33 | 0.33 | 0.31 | 0.32 |
| Crystallite diameter (μm) *Measurement Method 1 | 0.38 | 0.39 | 0.27 | 0.32 | 0.12 | 0.15 | 0.21 | 0.35 |
| Crystallite diameter (μm) *Measurement Method 2 | 0.22 | 0.23 | 0.16 | 0.20 | 0.07 | 0.1 | 0.12 | 0.20 |
| Mean particle diameter (D50)(μm) | 2.7 | 3 | 2.6 | 1.8 | 2.3 | 10.5 | 0.8 | 10.0 |
| Crystallite diameter/Mean particle diameter (D50) *Crystallite diameter: Measurement Method 1 | 0.141 | 0.130 | 0.104 | 0.178 | 0.052 | 0.014 | 0.263 | 0.035 |
| Crystallite diameter/Mean particle diameter (D50) *Crystallite diameter: Measurement Method 2 | 0.081 | 0.077 | 0.062 | 0.111 | 0.030 | 0.010 | 0.150 | 0.020 |
| 90% cumulative diameter D90 (μm) | 5.3 | 4.2 | 3.8 | 3.4 | 4.1 | 16.7 | 11.4 | 39.8 |
| Bulk density(g/cm³) | 0.83 | 0.74 | 0.72 | 0.64 | 0.66 | 1.33 | 0.54 | 1.14 |
| Specific surface area (m²/g) | 1.5 | 1.0 | 0.9 | 1.1 | 1.6 | 0.1 | 3.6 | 0.1 |
| Tap density (g/cm³) | 2.1 | 1.8 | 1.6 | 1.7 | 1.6 | 2.4 | 1.4 | 2.1 |
| Concentration in magnetically-adsorbing materials (ppb) | 120 | 150 | 180 | 180 | 10 | 240 | 320 | 200 |
| Cycle Test 1 (45° C. 4.3 V/3.0 V) | 95 | 98 | 97 | 96 | 95 | 100 | 83 | 99 |
| Cycle Test 2 (45° C. 50-80% SOC) | 102 | 108 | 114 | 105 | 96 | 100 | 84 | 97 |

TABLE 1-continued

| $Li_{1+x}(Mn_\alpha Co_\beta Ni_\gamma)_{1-x}O_2$ | Example 1 | Example 2 | Example 3 | Example 4 | Example 5 | Comparative Example 1 | Comparative Example 2 | Comparative Example 3 |
|---|---|---|---|---|---|---|---|---|
| Low Temperature Capacity Verification Test 3(0° C., 1 C. 4.3 V/3.0 V) | 135 | 134 | 139 | 146 | 143 | 100 | 118 | 103 |

DISCUSSION

Resulting from Table 1, although none of Example 1 to 5 exhibited excellent capabilities compared to conventional product (Comparative Example 1) in Cycle Test 1, examining the results of Cycle Test 2, in which charging and discharging was repeated in the middle region of depth of charge-discharge (for instance, 50-80% SOC), Examples 1 to 4 all exhibited excellent capabilities compared to conventional product (Comparative Example 1), and even for Example 5, results approximately equivalent to conventional product (Comparative Example 1) could be obtained. In addition, examining the Low Temperature Capacity Verification Test 3, that is to say, a test for evaluating output properties, Example 1 to 5 all exhibited particularly excellent capabilities compared to conventional product (Comparative Example 1).

From this result, it was found that a ratio of 0.05 to 0.20 is important for the crystallite diameter as determined by the Measurement Method 1 according to the Rietveld method with respect to the mean particle diameter (D50) as determined by the laser diffraction/scattering-type particle size distribution measurement method, and in addition, that a ratio of 0.03 to 0.13 is important for the crystallite diameter as determined by the Measurement Method 2 according to the Rietveld method with respect to the mean particle diameter (D50) as determined by the laser diffraction/scattering-type particle size distribution measurement method.

Although how the crystallite diameter/mean particle diameter (D50) ratio and battery properties (life span properties and output properties) when using in the middle region of depth of charge-discharge are related has not been identified by various tests and the like, by defining a crystallite diameter/mean particle diameter (D50) ratio in a lithium transition metal oxide having a layered structure, there are fewer active points inside the particle, which stabilizes the structure, furthermore, the internal diffusion of lithium ions during charging and discharging becomes satisfactory, and in addition, as the secondary particle diameter is small, the specific surface area is large and the surface area of reaction with the electrolytic solution becomes larger, attenuating the current density on the particle surface in the vicinity of the boundary surface with the electrolytic solution, which may be influencing. In addition, stabilization or the like owing to the resistance being kept low against volume expansion and contraction from storage-unstorage of lithium ions is also thought to be related since a change in volume from charging and discharging propagates with difficulty, or the like.

Regarding the concentration of materials attached by a magnet, from the remarkably low values exhibited by the concentrations in materials attached by a magnet of the samples obtained in Examples 1-5 compared to the concentrations in materials attached by a magnet of the samples obtained in Comparative Examples 1-3, there may be a large influence of the presence or absence of grinding by the percussion-type grinder fitted with a classification mechanism on the concentration of materials attached by a magnet. It can be also stated that the samples obtained in Examples 1-5, in which had low concentrations of materials attached by a magnet, exhibited excellent capabilities in Cycle Test 2 and Low Temperature Capacity Verification Test 3 compared to the samples obtained in Comparative Examples 1-3.

The invention claimed is:

1. A lithium transition metal oxide having a lithium transition metal oxide represented by General Formula $Li_{1+x}M_{1-x}O_2$ (M: transition metal) as a main component and containing the three elements Mn, Co and Ni as transition metals (M), wherein x in the General Formula is from 0.01 to 0.20; and having a layered structure, wherein the ratio of the crystallite diameter as determined by the Measurement Method 1 according to the Rietveld method carried out under the conditions shown in Table 2 with respect to the mean powder particle diameter (D50) as determined by a laser diffraction/scattering-type particle size distribution measurement method is 0.05 to 0.20 and the crystallite diameter as determined by the Measurement Method 1 is 0.1 µm to 0.5 µm, wherein the 90% cumulative diameter (D90) as determined by a laser diffraction/scattering-type particle size distribution measurement method is 2.0 µm to 10.0 µm.

TABLE 2

| <Measurement Method 1 According to the Rietveld Method> | |
|---|---|
| Measurement Device | X-ray Diffractomater using Cu-Kα beam |
| Analysis Parameters | FundamentalParameter |
| Analysis Range | Diffraction Angle 2θ = 10-120° |
| Analysis Software | Topas Version3 |
| Refinement Range (Machine Specs, Conditions, etc.) | Rwp <8.0, GOF <2.0 |
| Sample disp(mm) | Refine |
| Detector | PSD |
| Detector Type | VANTEC-1 |
| High Voltage | 5616 V |
| Discr. Lower Level | 0.35 V |
| Discr. Window Width | 0.15 V |
| Grid Lower Level | 0.075 V |
| Grid Window Width | 0.524 V |
| Flood Field Correction | Disabled |
| Primary radius | 250 mm |
| Secondary radius | 250 mm |
| Receiving slit width | 0.1436626 mm |
| Divergence angle | 0.3° |
| Filament Length | 12 mm |
| Sample Length | 25 mm |
| Receiving Slit Length | 12 mm |
| Primary Sollers | 2.623° |
| Secondary Sollers | 2.623° |
| Lorentzian, 1/Cos | 0.01630098 Th |
| Det. 1 voltage | 760.00 V |
| Det. 1 gain | 80.000000 |
| Det. 1 discr. 1 LL | 0.690000 |
| Det. 1 discr. 1 WW | 1.078000 |
| Scan Mode | Continuous Scan |
| Scan Type | Locked Coupled |
| Spinner Speed | 15 rpm |
| Divergence Slit | 0.300° |

TABLE 2-continued

<Measurement Method 1 According to the Rietveld Method>

| | |
|---|---|
| Start | 15.000000 |
| Time per step | 1 s |
| Increment | 0.01460 |
| #steps | 7152 |
| Generator voltage | 35 kV |
| Generator current | 40 mA. |

2. A lithium transition metal oxide having a lithium transition metal oxide represented by General Formula $Li_{1+x}M_{1-x}O_2$ (M: transition metal) as a main component and containing the three elements Mn Co and Ni as transition metals (M), wherein x in the General Formula is from 0.01 to 0.20; and
  having a layered structure, wherein the ratio of the crystallite diameter as determined by the Measurement Method 2 according to the Rietveld method carried out under the conditions shown in Table 3 with respect to the mean powder particle diameter (D50) as determined by a laser diffraction/scattering-type particle size distribution measurement method is 0.03 to 0.13 and the crystallite diameter as determined by the Measurement Method 2 is 0.01 µm to 0.50 µm,
  wherein the 90% cumulative diameter (D90) as determined by a laser diffraction/scattering type particle size distribution measurement method is 2.0 µm to 10.0 µm.

TABLE 3

<Measurement Method 2 According to the Rietveld Method>

| | |
|---|---|
| Measurement Device | X-ray Diffractomater using Cu-Kα beam |
| Analysis Parameters | FundamentalParameter |
| Analysis Range | Diffraction Angle 2θ = 15-120° |
| Analysis Software | Topas Version3 |
| Refinement Range | Rwp <5.0, GOF <1.3 |
| (Machine Specs, Conditions, etc.) | |
| Sample disp(mm) | Refine |
| Detector | PSD |
| Detector Type | VANTEC-1 |
| High Voltage | 5616 V |
| Discr. Lower Level | 0.45 V |
| Discr. Window Width | 0.15 V |
| Grid Lower Level | 0.075 V |
| Grid Window Width | 0.524 V |
| Flood Field Correction | Disabled |
| Primary radius | 250 mm |
| Secondary radius | 250 mm |
| Receiving slit width | 0.1436626 mm |
| Divergence angle | 0.3° |
| Filament Length | 12 mm |
| Sample Length | 25 mm |
| Receiving Slit Length | 12 mm |
| Primary Sollers | 2.623° |
| Secondary Sollers | 2.623° |
| Lorentzian, 1/Cos | 0.01630098 Th |
| Det. 1 voltage | 760.00 V |
| Det. 1 gain | 80.000000 |
| Det. 1 discr. 1 LL | 0.690000 |
| Det. 1 discr. 1 WW | 1.078000 |
| Scan Mode | Continuous Scan |
| Scan Type | Locked Coupled |
| Spinner Speed | 15 rpm |
| Divergence Slit | 0.300° |
| Start | 15.000000 |
| Time per step | 1 s |
| Increment | 0.01460 |
| #steps | 7152 |
| Generator voltage | 35 kV |
| Generator current | 40 mA. |

3. The lithium transition metal oxide according to claim 1, wherein said mean powder particle diameter (D50) as determined by a laser diffraction/scattering-type particle size distribution measurement method is 1.0 µm to 4.0 µm.

4. The lithium transition metal oxide according to claim 2 wherein said mean powder particle diameter (D50) as determined by a laser diffraction/scattering-type particle size distribution measurement method is 1.0 µm to 4.0 µm.

5. The lithium transition metal oxide according to claim 1, wherein the specific surface area of the lithium transition metal oxide is 0.3 to 2.0 $m^2/g$.

6. The lithium transition metal oxide according to claim 2, wherein the specific surface area of the lithium transition metal oxide is 0.3 to 2.0 $m^2/g$.

7. The lithium transition metal oxide according to claim 1, wherein the Tap density of the lithium transition metal oxide is 1.4 to 2.5 $g/cm^3$.

8. The lithium transition metal oxide according to claim 2, wherein the Tap density of the lithium transition metal oxide is 1.4 to 2.5 $g/cm^3$.

9. The lithium transition metal oxide according to claim 1, wherein the concentration of magnetically-attaching material is less than 200 ppb.

10. The lithium transition metal oxide according to claim 2, wherein the concentration of magnetically-attaching material is less than 200 ppb.

11. A lithium battery comprising the lithium transition metal oxide according to claim 1 as a positive electrode active material.

12. A lithium battery comprising the lithium transition metal oxide according to claim 2 as a positive electrode active material.

13. A lithium transition metal oxide having a layered structure, represented by General Formula $Li_{1+x}M_{1-x}O_2$ (M: transition metal) as a main component and containing the three elements Mn, Co and Ni as transition metals (M),
  wherein x in the General Formula is from 0.01 to 0.20,
  wherein the ratio of the crystallite diameter as determined by the Measurement Method 1 according to the Rietveld method carried out under the conditions shown in Table 2 with respect to the mean powder particle diameter (D50) as determined by a laser diffraction/scattering-type particle size distribution measurement method is 0.05 to 0.20 and the crystallite diameter as determined by the Measurement Method 1 is 0.1 µm to 0.5 µm, and
  wherein said mean powder particle diameter (D50) is 1.0 µm to 4.0 µm.

TABLE 2

<Measurement Method 1 According to the Rietveld Method>

| | |
|---|---|
| Measurement Device | X-ray Diffractomater using Cu-Kα beam |
| Analysis Parameters | FundamentalParameter |
| Analysis Range | Diffraction Angle 2θ = 10-120° |
| Analysis Software | Topas Version3 |
| Refinement Range | Rwp <8.0, GOF <2.0 |
| (Machine Specs, Conditions, etc.) | |
| Sample disp(mm) | Refine |
| Detector | PSD |
| Detector Type | VANTEC-1 |
| High Voltage | 5616 V |
| Discr. Lower Level | 0.35 V |
| Discr. Window Width | 0.15 V |
| Grid Lower Level | 0.075 V |
| Grid Window Width | 0.524 V |
| Flood Field Correction | Disabled |
| Primary radius | 250 mm |
| Secondary radius | 250 mm |
| Receiving slit width | 0.1436626 mm |

TABLE 2-continued

<Measurement Method 1 According to the Rietveld Method>

| | |
|---|---|
| Divergence angle | 0.3° |
| Filament Length | 12 mm |
| Sample Length | 25 mm |
| Receiving Slit Length | 12 mm |
| Primary Sollers | 2.623° |
| Secondary Sollers | 2.623° |
| Lorentzian, 1/Cos | 0.01630098 Th |
| Det. 1 voltage | 760.00 V |
| Det. 1 gain | 80.000000 |
| Det. 1 discr. 1 LL | 0.690000 |
| Det. 1 discr. 1 WW | 1.078000 |
| Scan Mode | Continuous Scan |
| Scan Type | Locked Coupled |
| Spinner Speed | 15 rpm |
| Divergence Slit | 0.300° |
| Start | 15.000000 |
| Time per step | 1 s |
| Increment | 0.01460 |
| #steps | 7152 |
| Generator voltage | 35 kV |
| Generator current | 40 mA |

TABLE 3

<Measurement Method 2 According to the Rietveld Method>

| | |
|---|---|
| Measurement Device | X-ray Diffractomater using Cu-Kα beam |
| Analysis Parameters | FundamentalParameter |
| Analysis Range | Diffraction Angle 2θ = 15-120° |
| Analysis Software | Topas Version3 |
| Refinement Range (Machine Specs, Conditions, etc.) | Rwp <5.0, GOF <1.3 |
| Sample disp(mm) | Refine |
| Detector | PSD |
| Detector Type | VANTEC-1 |
| High Voltage | 5616 V |
| Discr. Lower Level | 0.45 V |
| Discr. Window Width | 0.15 V |
| Grid Lower Level | 0.075 V |
| Grid Window Width | 0.524 V |
| Flood Field Correction | Disabled |
| Primary radius | 250 mm |
| Secondary radius | 250 mm |
| Receiving slit width | 0.1436626 mm |
| Divergence angle | 0.3° |
| Filament Length | 12 mm |
| Sample Length | 25 mm |
| Receiving Slit Length | 12 mm |
| Primary Sollers | 2.623° |
| Secondary Sollers | 2.623° |
| Lorentzian, 1/Cos | 0.01630098 Th |
| Det. 1 voltage | 760.00 V |
| Det. 1 gain | 80.000000 |
| Det. 1 discr. 1 LL | 0.690000 |
| Det. 1 discr. 1 WW | 1.078000 |
| Scan Mode | Continuous Scan |
| Scan Type | Locked Coupled |
| Spinner Speed | 15 rpm |
| Divergence Slit | 0.300° |
| Start | 15.000000 |
| Time per step | 1 s |
| Increment | 0.01460 |
| #steps | 7152 |
| Generator voltage | 35 kV |
| Generator current | 40 mA |

14. A lithium transition metal oxide having a layered structure, represented by General Formula $Li_{1+x}M_{1-x}O_2$ (M: transition metal) as a main component and containing the three elements Mn, Co and Ni as transition metals (M), wherein x in the General Formula is from 0.01 to 0.20, wherein the ratio of the crystallite diameter as determined by the Measurement Method 2 according to the Rietveld method carried out under the conditions shown in Table 3 with respect to the mean powder particle diameter (D50) as determined by a laser diffraction/scattering-type particle size distribution measurement method is 0.03 to 0.13 and the crystallite diameter as determined by the Measurement Method 2 is 0.01 μm to 0.50 μm, and wherein said mean powder particle diameter (D50) is 1.0 μm to 4.0 μm.

* * * * *

UNITED STATES PATENT AND TRADEMARK OFFICE
CERTIFICATE OF CORRECTION

PATENT NO. : 7,927,741 B2  
APPLICATION NO. : 12/524274  
DATED : April 19, 2011  
INVENTOR(S) : Tomoya Takeuchi et al.

Page 1 of 1

It is certified that error appears in the above-identified patent and that said Letters Patent is hereby corrected as shown below:

Claim 1, in Table 2, col. 22, line 38, "Diffractomater" should read --Diffractometer--

Claim 1, in Table 2, col. 22, line 39, insert -- -- (space) between "Fundamental" and "Parameter"

Claim 2, col. 23, line 13, "Mn Co" should read --Mn, Co--

Claim 2, col. 23, line 25, insert -- - -- (hyphen) between "scattering" and "type"

Claim 2, in Table 3, col. 23, line 31, "Diffractomater" should read --Diffractometer--

Claim 2, in Table 3, col. 23, line 32, insert -- -- (space) between "Fundamental" and "Parameter"

Claim 13, in Table 2, col. 24, line 51, "Diffractomater" should read --Diffractometer--

Claim 13, in Table 2, col. 24, line 52, insert -- -- (space) between "Fundamental" and "Parameter"

Claim 14, in Table 3, col. 26, line 4, "Diffractomater" should read --Diffractometer--

Claim 14, in Table 3, col. 26, line 5, insert -- -- (space) between "Fundamental" and "Parameter"

Signed and Sealed this  
Twenty-seventh Day of September, 2011

David J. Kappos  
*Director of the United States Patent and Trademark Office*